(12) United States Patent
Chiu et al.

(10) Patent No.: US 8,072,997 B2
(45) Date of Patent: Dec. 6, 2011

(54) PACKET RECEIVING MANAGEMENT METHOD AND NETWORK CONTROL CIRCUIT WITH PACKET RECEIVING MANAGEMENT FUNCTIONALITY

(75) Inventors: Yung-Feng Chiu, Taichung (TW); Po-Chen Chen, Taoyuan County (TW)

(73) Assignee: JMicron Technology Corp., Science-Based Industrial Park, Hsin-Chu (TW)

( * ) Notice: Subject to any disclaimer, the term of this patent is extended or adjusted under 35 U.S.C. 154(b) by 278 days.

(21) Appl. No.: 12/508,570

(22) Filed: Jul. 24, 2009

(65) Prior Publication Data
US 2010/0290470 A1   Nov. 18, 2010

(30) Foreign Application Priority Data
May 13, 2009   (TW) ............................... 98115820 A

(51) Int. Cl.
*H04L 12/28*   (2006.01)
(52) U.S. Cl. ........................................ 370/412; 370/394
(58) Field of Classification Search ........................ None
See application file for complete search history.

(56) References Cited

U.S. PATENT DOCUMENTS

| | | | |
|---|---|---|---|
| 6,724,767 B1* | 4/2004 | Chong et al. | 370/412 |
| 7,327,755 B2* | 2/2008 | Nie | 370/466 |
| 2010/0290470 A1* | 11/2010 | Chiu et al. | 370/394 |

* cited by examiner

*Primary Examiner* — Robert Wilson
(74) *Attorney, Agent, or Firm* — Winston Hsu; Scott Margo

(57) ABSTRACT

A method of network packet receiving management includes: providing a buffer unit which includes a plurality of data blocks with a first packet number and a plurality of data blocks with a second number of packets, wherein the data blocks with the first packet number are for storing a plurality of first network packets according to a first array data structure, respectively, the first array data structure has a plurality of first packet descriptors corresponding to the first packet number, and the data blocks with the second number of packets do not correspond to any packet descriptor; and when a first data block corresponding to a first packet descriptor successively receives a first network packet, changing the first packet descriptor corresponding to the first data block to indicate a second data block which does not correspond to any packet descriptor.

10 Claims, 4 Drawing Sheets

Data block: DB3_1, DB3_2, DB3_3, DB3_4, DB4_1, DB4_2, DB4_3, DB4_4, DB5_1, DB5_2, DB5_3, DB5_4
Network packet: Pc1, Pc2, Pc3, Pc4, Pd1, Pd2, Pd3, Pd4
Packet descriptor: Dc1, Dc2, Dc3, Dc4, Dd1, Dd2, Dd3, Dd4

PACKET RECEIVING MANAGEMENT METHOD AND NETWORK CONTROL CIRCUIT WITH PACKET RECEIVING MANAGEMENT FUNCTIONALITY

BACKGROUND OF THE INVENTION

1. Field of the Invention

The present invention relates to a network packet receiving management method and related apparatus, and more particularly, to a network packet receiving management method based on an array data structure and an apparatus thereof.

2. Description of the Prior Art

A network interface controller (NIC) provides an identifiable address for an electronic apparatus connecting to a network, and functions as a communication interface between the electronic apparatus and the network. When the electronic apparatus successively receives a network packet from the network, the network interface controller will upload the received network packet to a processing unit within the electronic apparatus, and receive a processed network packet replied by the processing unit. Generally speaking, the data structures adopted by network interface controllers in the present time are mostly linked-list data structures or array data structures. For a received network packet, the linked-list data structure indicates an address of a previous network packet, an address of a next network packet, or both addresses of the previous network packet and the next network packet; in this way, when the processing unit replies packets in an order different from an order used by the network interface controller for uploading packets, the processing unit can still easily find out a sequence of the data arrangement. However, one disadvantage of the linked-list data structure is that it requires more system resource to process and store addresses indicative of a previous and/or a next network packet. On the other hand, the array data structure utilizes a more simplified structure and requires only a little storage space and system resource. The disadvantage of the array data structure is that when the processing unit replies packets in an order different from an order used by the network interface controller for uploading packets, an out-of-order issue will occur, leading to a decrement in interface utilization efficiency.

Please refer to FIG. 1, which is a diagram illustrating an operation of a network packet receiving management method based on an array data structure according to the prior art. An array A1 has four data blocks DB1~DB4, indicated by four packet descriptors Da1~Da4, respectively. When the network control interface receives network packets via a network successively, the network packets are stored into the array A1 sequentially; besides, when the data block DB4 indicated by the last packet descriptor Da4 is also occupied by one of the network packets, it will start all over again to store the next network packet in the data block DB1 indicated by the array descriptor Da1. After the array A1 is full with network packets Pa1~Pa4 and those network packets Pa1~Pa4 are uploaded sequentially to at least one processor 105, processed network packets Pa1'~Pa4' may not be replied in exact the same order in which they are uploaded. For example, the processed network packets are replied to the network interface controller in an order as follows: Pa1', Pa3', Pa4', Pa2'. The network packet Pa1' is firstly stored in the data block DB1 indicated by the packet descriptor Da1 correctly; nevertheless, since the data block DB2 indicated by the packet descriptor Da2 is for storing the network packet Pa2', even the processed network packets Pa3' and Pa4' are already stored in a buffer unit 110, those processed network packets Pa3' and Pa4' are not stored in the data blocks DB3 and DB4 indicated by the array descriptors Da3 and Da4, respectively, until the processed network packet Pa2' is successively received and stored in the data block DB2. In this example, the network packet Pa2', which is not replied in order, causes a bubble in the receiving mechanism, leading to degradation in overall receiving efficiency.

SUMMARY OF THE INVENTION

One of the objectives of the present invention is to provide a network packet receiving management method based on an array data structure and a network control circuit thereof, to solve packet out-of-order problem and simplify hardware interface. In this way, the overall system performance can be improved and hardware cost can also be reduced.

According to one embodiment of the present invention, a method is provided. The method includes following steps: providing a buffer unit having at least a plurality of data blocks with a first packet number and a plurality of data blocks with a second packet number; storing a plurality of first network packets into the plurality of data blocks with the first packet number according to a first array data structure, wherein the first array data structure comprises a plurality of first packet descriptors corresponding to the first packet number, the plurality of data blocks with the first packet number correspond to the first packet descriptors, and the plurality of data blocks with the second packet number have not yet be associated with the packet descriptor; and changing a first packet descriptor associated with a first data block within the buffer unit to a second data block within the buffer unit when the first data block successively receives a first network packet, wherein the second data block has not yet be associated with the packet descriptor before the changing of the first packet data descriptor associated with the first data block.

According to another embodiment of the present invention, a network control circuit is provided. The network control circuit includes a buffer unit and a processing unit. The buffer unit includes at least a plurality of data blocks with a first packet number and a plurality of data blocks with a second packet number, wherein the plurality of data blocks with the first packet number store a plurality of first network packets according to a first array data structure, the first array data structure includes a plurality of first packet descriptors corresponding to the first packet number, the data blocks with the first packet number correspond to the first packet descriptors, and the plurality of data blocks with the second packet number have not yet be associated with the packet descriptor. The processing unit is coupled to the buffer unit, and implemented for changing a first packet descriptor associated with a first data block within the buffer unit to a second data block within the buffer unit when the first data block successively receives a first network packet, wherein the second data block has not yet be associated with the packet descriptor before the processing unit changes the first packet data descriptor associated with the first data block.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
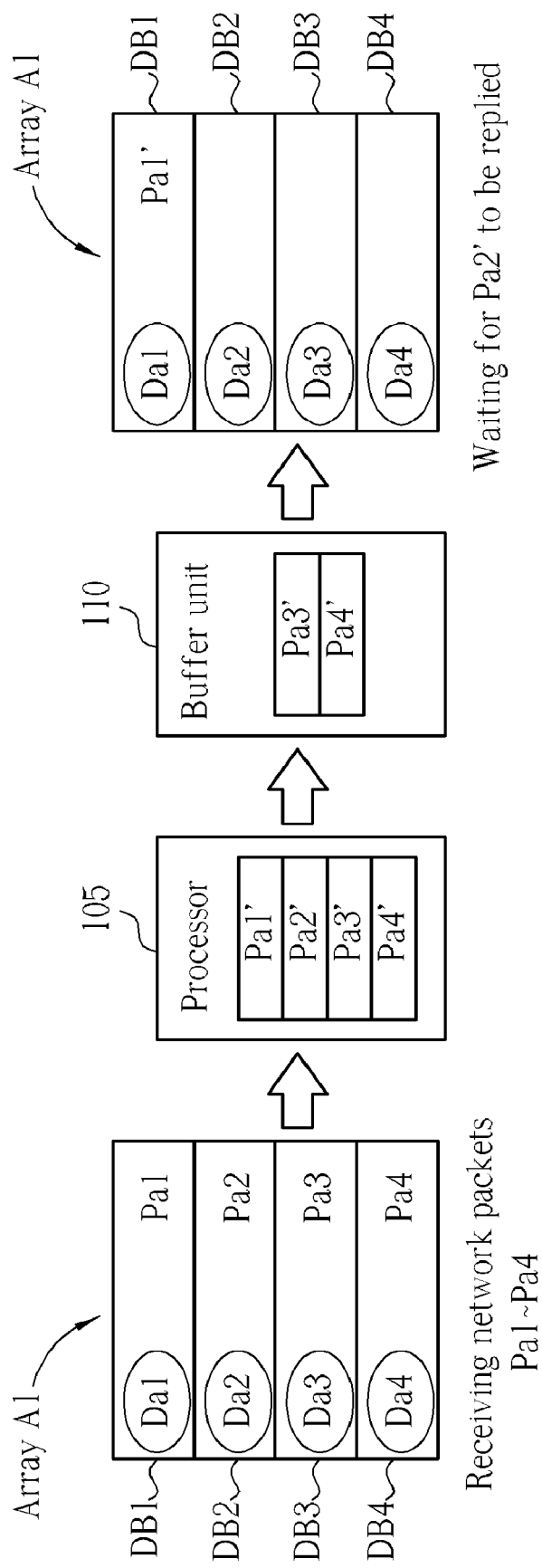
FIG. 1 is a diagram illustrating an operation of a network packet receiving management method based on an array data structure according to the prior art.
Figure 2:
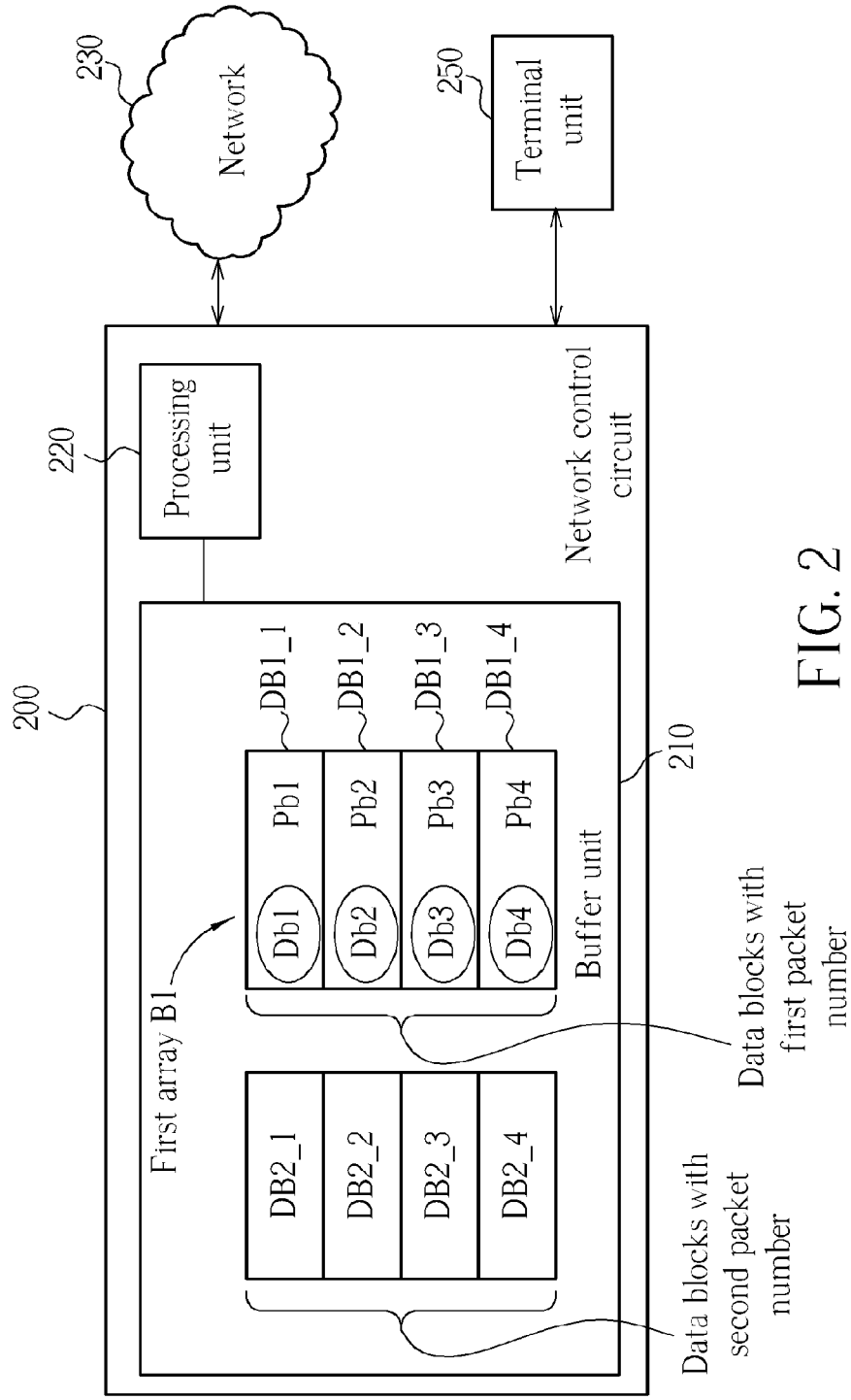
FIG. 2 is a diagram of a network control circuit according to an embodiment of the present invention.

Please refer to FIG. 2, which is a diagram of a network control circuit according to an embodiment of the present invention. In this embodiment, the network control circuit 200 is coupled to a network 230 and a terminal unit (e.g., a processor) 250. The network control circuit 200 includes (but not limited to) a buffer unit 210 and a processing unit 220. The functions and the operations of the buffer unit 210 and the processing unit 220 can be briefly summarized as follows. The buffer unit 210 includes at least a plurality of data blocks with a first packet number and a plurality of data blocks with a second packet number, wherein the plurality of data blocks with the first packet number store a plurality of first network packets according to a first array data structure, the first array data structure comprises a plurality of first packet descriptors corresponding to the first packet number, the data blocks with the first packet number correspond to the first packet descriptors, and the plurality of data blocks with the second packet number have not yet be associated with the packet descriptor. In addition, the processing unit 220 is coupled to the buffer unit 210, for changing a first packet descriptor associated with a first data block within the buffer unit 210 to a second data block within the buffer unit 210 when the first data block successively receives a first network packet, wherein the second data block has not yet be associated with the packet descriptor before the processing unit changes the first packet data descriptor associated with the first data block.

To further explain the network packet receiving management method of the present invention, please refer to FIG. 2 in conjunction with the following description. The buffer unit 210 includes a first array B1 to receive and store data based on an array data structure. In this embodiment, the first array B1 has four data blocks DB1_1~DB1_4, indicated by four packet descriptors Db1~Db4, respectively. When the network control circuit 200 (e.g., a network interface controller) receives network packets successively via the network 230, the network control circuit 200 stores network packets into data blocks DB1_1~DB1_4 (i.e., the aforementioned plurality of data blocks with the first packet number) within the first array B1 sequentially; when the data block indicated by the last array descriptor Db4 is occupied by a data packet, the network control circuit 200 starts all over again to store network packets in the data block indicated by the array descriptor Db1. As shown in FIG. 2, the data blocks DB1_1~DB1_4 store network packet Pb1~Pb4, respectively. In addition to the data blocks DB1_1~DB1_4 indicated by the packet descriptors Db1~Db4, the buffer unit 210 further allocates four free data blocks DB2_1~DB2_4 (i.e., the aforementioned data blocks with the second packet number), in which the four free data blocks DB2_1~DB2_4 have not yet be associated with the packet descriptor.

Figure 3:
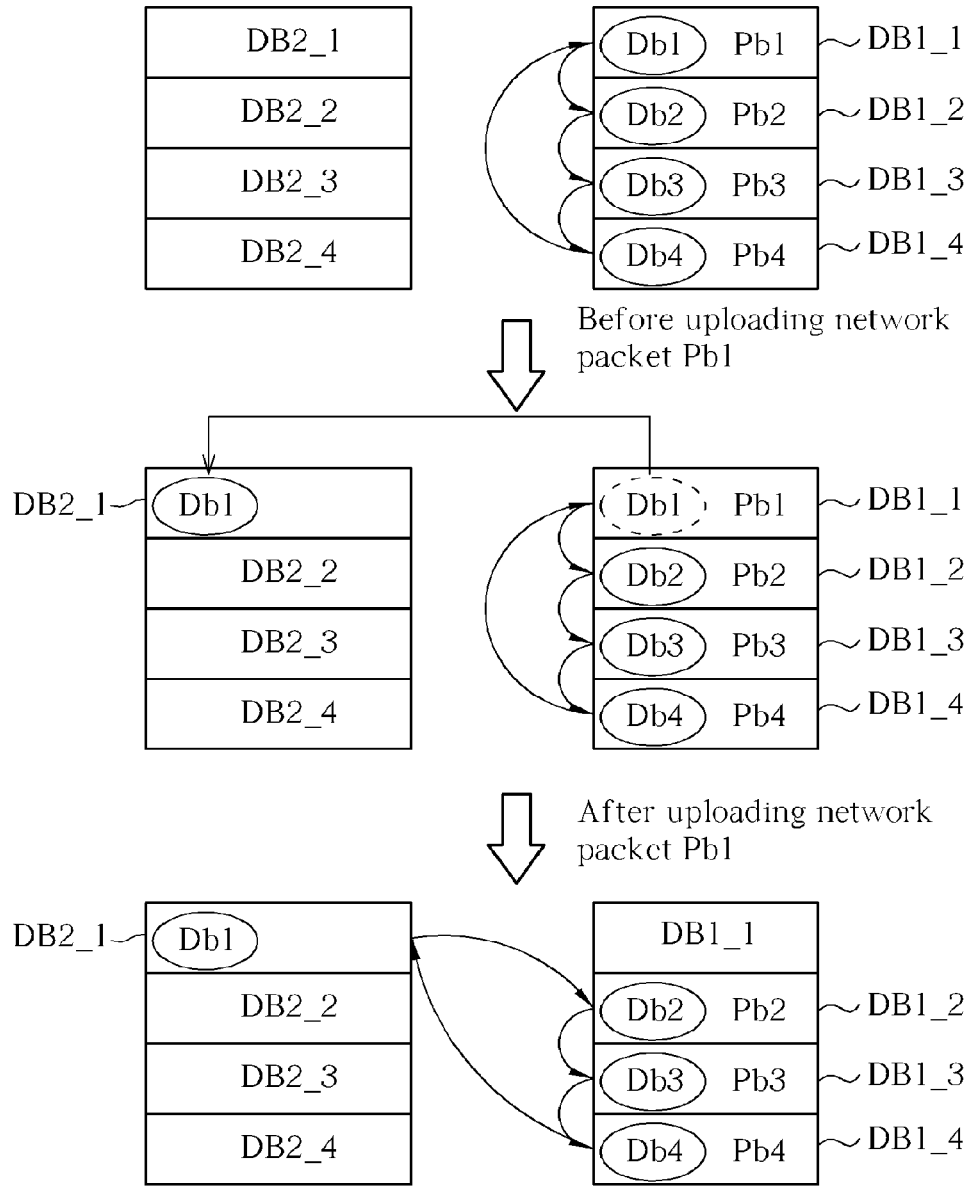
FIG. 3 is a diagram illustrating an operation of a processing unit within a network processing circuit which changes a correspondence of a packet descriptor from a data block to indicate a free data block.

When the first array B1 is full with network packets Pb1~Pb4 and before those network packets Pb1~Pb4 are uploaded sequentially to a terminal unit 250, the processing unit 220 will assign packet descriptors Db1~Db4 to indicate four free data blocks DB2_1~DB2_4 which do not correspond to any packet descriptor. For example, before the network control circuit 200 uploads the network packet Pb1, the processing unit 220 within the network control circuit 200 will change the packet descriptor Db1 from the data block DB1_1 to one of the free data blocks DB2_1~DB2_4, and after the network packet Pb1 is uploaded successively and after the processed network packet is replied, the data block DB1_1 occupied by the network packet Pb1 and originally indicated by the packet descriptor Db1 also becomes a free data block. Please refer to FIG. 3 for further comprehension of the aforementioned operation. The original array data structure is composed of data blocks DB1_1~DB1_4. Before the network packet Pb1 is uploaded, the packet descriptor Db1 is changed from the data block DB1_1 to indicate the data block DB2_1, therefore, the block DB2_1, which originally belongs to the free data blocks, becomes a part of the first array B1, and the data block DB1_1 is only for storing the network packet Pb1 which is waiting for being uploaded. After the network packet Pb1 within the data block DB1_1 is successively uploaded and after the processed network packet is replied, the data block DB1_1 becomes a free data block accordingly. It should be obvious that the number of the free data blocks is eventually four, and the number of the data blocks corresponding to the array data structure (packet descriptors Db1~Db4) also remains to be four; in other words, in this embodiment, there are always four data blocks corresponding to array descriptors Db1~Db4 and four free data blocks corresponding to no packet descriptor in the buffer unit 210. Compared with the prior art, the present invention provides a free data block that replaces a data block before a network packet within the data block is uploaded; in this way, the bubble in the array data structure will not occur since packet descriptors do not have to wait for processed network packets to be replied in order, and the aforementioned array out-of-order issue can be solved.

Please note that the aforementioned embodiments are for illustrative purpose only, and they are not supposed to be limitations to the present invention. For example, the number of data blocks contained within the first array B1 can vary according to different design requirements, and is therefore not limited to be four; similarly, the number of free data blocks can also vary according to different design requirements, and it is not necessary to be identical to the number of data blocks contained within the first array B1. Besides, when a number of network packets, which are successively stored and wait for being uploaded, exceeds a predetermined number, the processing unit 220 can dynamically increase the number of free data blocks; on the other hand, when the number of network packets, which are successively stored and wait for being uploaded, is less than a predetermined number, the processing unit 220 can dynamically decrease the number of free data blocks to release more storage space. In this way, the network control circuit 200 can dynamically adjust the efficiency of receiving network packets according to a load status of the terminal unit 250.

Figure 4:
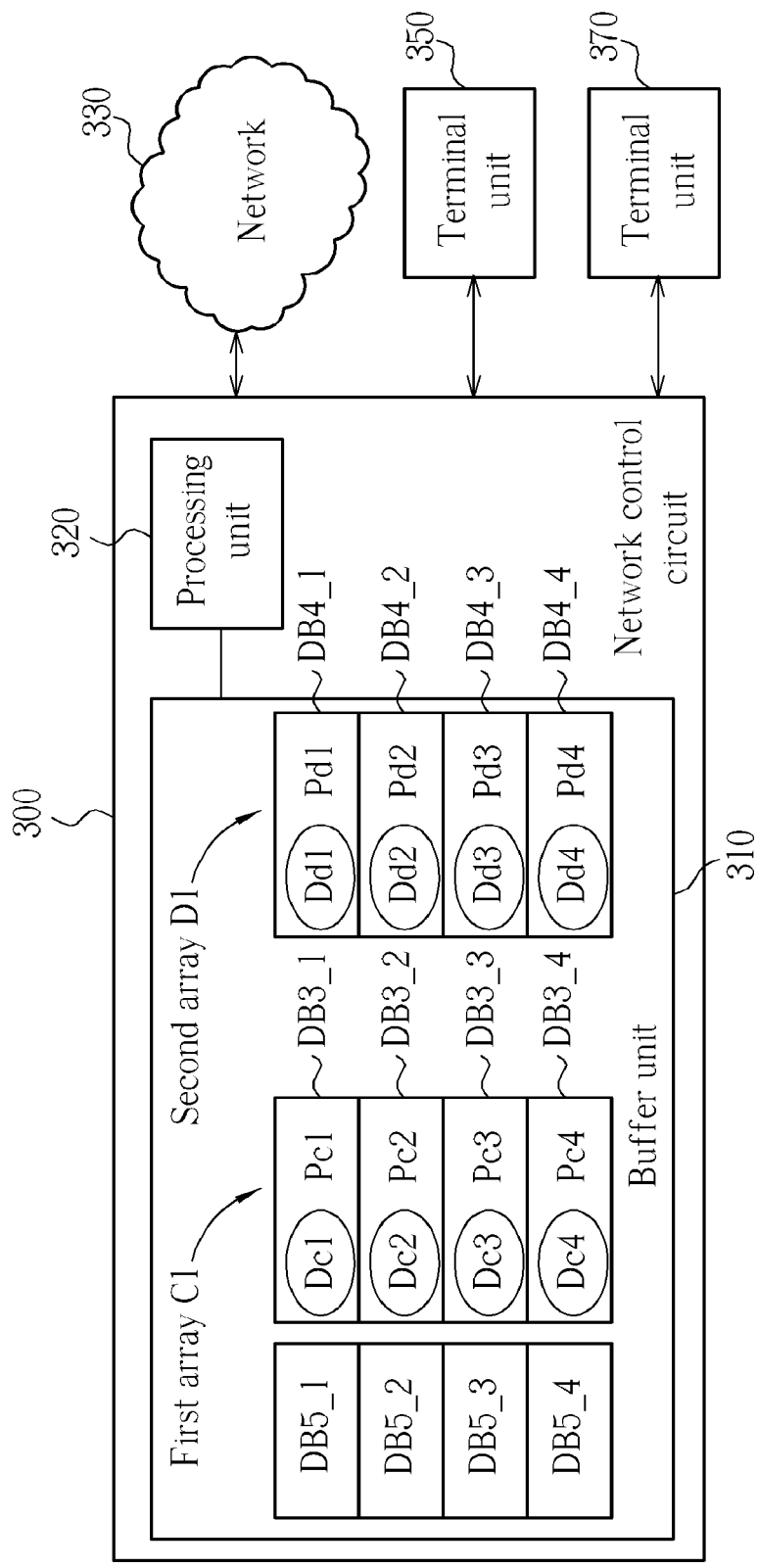
FIG. 4 is a diagram of a network control circuit according to another embodiment of the present invention.

Please refer to FIG. 4, which is a network control circuit according to another embodiment of the present invention. In this embodiment, the network control circuit 300 is coupled to a network 300 and a plurality of terminal units (e.g., a plurality of processors within a multi-core system) 350, 370, and the network control circuit 300 includes a buffer unit 310 and a processing unit 320. Compared with the network control circuit 200 in FIG. 2, the network control circuit 300 in FIG. 4 is coupled to multiple terminal units rather than a single terminal unit. As all component function substantially the same as the components within the network control circuit 200 in FIG. 2, further description is omitted here fore brevity. In addition, the buffer unit 310 in FIG. 4, different from the buffer unit 210 in FIG. 2, has a first array C1 and a second array D1 to receive and store data (network packets) for terminal units 350 and 370, respectively. The first array C1 and the second array D1 have four data blocks DB3_1~DB3_4, DB4_1~DB4_4, indicated by four packet descriptors Dc1~Dc4, Dd1~Dd4, respectively. In addition to the data blocks DB3_1~DB3_4, DB4_1~DB4_4 indicated by the packet descriptors Dc1~Dc4, Dd1~Dd4, respectively, the buffer unit 310 further allocates four free data blocks DB5_1~DB5_4 in which the four free data blocks DB5_1~DB5_4 have not yet be associated with the packet descriptor. When the first array C1 is occupied by at least one network packet, namely, network packet Pc1 (since network packets Pc1~Pc4 are stored in sequence, the first array C1 is firstly occupied by network packets Pc1), and before the network packet Pc1 is uploaded sequentially to the terminal unit 350, the processing unit 320 will assign packet descriptor Dc1 to indicate a free data block, in which the free data block has not yet be associated with the packet descriptor; meanwhile, when the second array D1 is occupied by at least one network packet, namely network packet Pd1, and before the network packet Pd1 is uploaded sequentially to the terminal unit 370, the processing unit 320 will also assign packet descriptor Dd1 to indicate a free data block, in which the free data block has not yet be associated with the packet descriptor.

For example, before the network control circuit 300 uploads the network packet Pc1, the processing unit 320 will change of the packet descriptor Dc1 to one of the free data blocks DB5_1~DB5_4, and after the network packet Pc1 is uploaded successively and after the processed network packet is replied, the data block DB3_1 occupied by the network packet Pc1 and originally indicated by the packet descriptor Dc1 becomes a free data block accordingly. As the related operational mechanism can be easily comprehended via the example shown in FIG. 3, further description is omitted here fore brevity. Similarly, in this embodiment, there are always four data blocks indicated by array descriptors Dc1~Dc4, four data blocks indicated by array descriptors Dd1~Dd4 and four free data blocks, in which the four free data blocks have not yet be associated with the packet descriptor in the buffer unit 310.

Please note that the aforementioned embodiment is for illustrative purpose only, and it is not supposed to be limitations to the present invention. For example, the number of data blocks contained within the first array C1 and the number of data blocks contained within the second array D1 can vary according to different design requirements, and are not limited to be four; similarly, the number of free data blocks can also vary according to design requirements, and it is not necessary to be identical to the number of data blocks contained within the first array C1 or the number of data blocks contained within the second array D1. Besides, when a number of network packets, which are successively stored and wait for being uploaded, exceeds a predetermined number, the processing unit 320 can dynamically increase the number of free data blocks; on the other hand, when the number of network packets, which are successively stored and wait for being uploaded, is less than a predetermined number, the processing unit 320 can dynamically decrease the number of free data blocks to release more storage space.

In addition, when the number of the free data blocks are fixed, the packet descriptors of the first array C1 and the second array D1 share the free data blocks with the fixed number, where the principle of allocating free data blocks is that each terminal unit takes a different number of free data blocks according to respective requirements, i.e., a load balance is achieved due to that fact that each terminal unit utilizes resource of the free data blocks according to its own load status.

Please note that the description above is only a preferred implementation of the present invention; in an alternative design, the processing unit 320 can also utilize a predetermined ratio to allocate free data blocks within the buffer unit 310 to the first array C1 and the second array D1, and this variation in design also falls within the scope of the present invention.

To summarize, the present invention provides a network packet receiving management method and related apparatus. Since the present invention adopts an array data structure, only one adder is required for a practical implementation, and the amount of hardware can be reduced and a cost can be saved effectively; besides, reading an extra index of packet descriptors is not required, leading to a great decrement of the load of the interface. In addition, the introduction of the free data blocks in the present invention can effectively avoid the array out-of-order problem, thereby enhancing a packet receiving rate. Additionally, the function of dynamically varying the number of free data blocks can compensate the defect that an array data structure cannot dynamically vary its own size. Furthermore, the present invention provides a load balance scheme under a configuration of multiple arrays of packet descriptors, whereby great performance can be accomplished in the mainstream multi-core system.

Those skilled in the art will readily observe that numerous modifications and alterations of the device and method may be made while retaining the teachings of the invention.

What is claimed is:

1. A method comprising:
   providing a buffer unit having at least a plurality of data blocks with a first packet number and a plurality of data blocks with a second packet number;
   storing a plurality of first network packets into the plurality of data blocks with the first packet number according to a first array data structure, wherein the first array data structure comprises a plurality of first packet descriptors corresponding to the first packet number, the plurality of data blocks with the first packet number correspond to the first packet descriptors, and the plurality of data blocks with the second packet number have not yet be associated with the packet descriptor; and
   changing a first packet descriptor associated with a first data block within the buffer unit to a second data block within the buffer unit when the first data block successively receives a first network packet, wherein the second data block has not yet be associated with the packet descriptor before the first packet data descriptor associated with the first data block is changed.

2. The method of claim 1, further comprising:
   outputting the first network packet in the first data block to a terminal unit after the first packet descriptor associated with the first data block within the buffer unit is changed to the second data block within the buffer unit.

3. The method of claim 1, further comprising:
   dynamically adjusting a number of data blocks within the buffer unit according to a total number of data blocks storing network packets that are waiting to be output, wherein the number of data blocks within the buffer unit have not yet be associated with the packet descriptor.

4. The method of claim 1, wherein the buffer unit further comprises a plurality of data blocks with a third packet number; the data blocks with the third packet number store a plurality of second network packets according to a second array data structure; the second array data structure comprises a plurality of second packet descriptors corresponding to the third packet number; the data blocks with the third packet number correspond to the second packet descriptors; and the network packet receiving management method further comprises:

changing a second packet descriptor associated with a third data block within the buffer unit to a fourth data block within the buffer unit when the third data block successively receives a second network packet, wherein the fourth data block has not yet be associated with the packet descriptor before the second packet data descriptor associated with the third data block is changed.

5. The method of claim 4, further comprising:
dynamically adjusting a number of data blocks within the buffer unit according to a total number of data blocks that store network packets waiting to be output, wherein the number of data blocks within the buffer unit have not yet be associated with the packet descriptor.

6. A network control circuit comprising:
a buffer unit, having at least a plurality of data blocks with a first packet number and a plurality of data blocks with a second packet number, wherein the plurality of data blocks with the first packet number store a plurality of first network packets according to a first array data structure; the first array data structure comprises a plurality of first packet descriptors corresponding to the first packet number; the data blocks with the first packet number correspond to the first packet descriptors; and the plurality of data blocks with the second packet number have not yet be associated with the packet descriptor; and
a processing unit, coupled to the buffer unit, for changing a first packet descriptor associated with a first data block within the buffer unit to a second data block within the buffer unit when the first data block successively receives a first network packet, wherein the second data block has not yet be associated with the packet descriptor before the processing unit changes the first packet data descriptor associated with the first data block.

7. The network control circuit of claim 6, wherein the processing unit outputs the first network packet in the first data block to a terminal unit after the processing unit changes the first packet descriptor associated with the first data block within the buffer unit to the second data block within the buffer unit.

8. The network control circuit of claim 6, wherein the processing unit further dynamically adjusts a number of data blocks within the buffer unit according to a total number of data blocks that store network packets waiting to be output, wherein the number of data blocks within the buffer unit have not yet be associated with the packet descriptor.

9. The network control circuit of claim 6, wherein the buffer unit further comprises a plurality of data blocks with a third packet number; the data blocks with the third packet number store a plurality of second network packets according to a second array data structure; the second array data structure comprises a plurality of second packet descriptors corresponding to the third packet number; the data blocks with the third packet number correspond to the second packet descriptors; and the processing unit further changes a second packet descriptor associated with a third data block within the buffer unit to a fourth data block within the buffer unit when the third data block successively receives a second network packet, wherein the fourth data block has not yet be associated with the packet descriptor before the processing unit changes the second packet data descriptor associated with the third data block.

10. The network control circuit of claim 9, wherein the processing unit further dynamically adjusts a number of data blocks within the buffer unit according to a total number of data blocks storing network packets that are waiting to be output, wherein the number of data blocks within the buffer unit have not yet be associated with the packet descriptor.

* * * * *